United States Patent [19]
Fowler

[11] 3,897,169
[45] July 29, 1975

[54] LEAKAGE CONTROL STRUCTURE
[75] Inventor: Jackson E. Fowler, Schenectady, N.Y.
[73] Assignee: General Electric Company, Schenectady, N.Y.
[22] Filed: Apr. 19, 1973
[21] Appl. No.: 352,569

[52] U.S. Cl................ 415/172 A; 277/53; 277/56; 415/199 R
[51] Int. Cl............................................. F01d 5/20
[58] Field of Search .......... 415/169, 170, 171, 172, 415/173, 115, 109, 117, 172 A, 139, 111; 277/53

[56] References Cited
UNITED STATES PATENTS

| | | | |
|---|---|---|---|
| 1,482,031 | 1/1924 | Parsons et al.................. | 415/172 A |
| 1,756,958 | 5/1930 | Schmidt............................... | 277/56 |
| 2,614,870 | 10/1952 | Ray....................................... | 277/55 |
| 2,910,269 | 10/1959 | Haworth et al...................... | 415/117 |
| 3,011,762 | 12/1961 | Pouit..................................... | 415/109 |
| 3,021,110 | 2/1962 | Rankin et al. ...................... | 415/139 |
| 3,067,983 | 12/1962 | Koziura............................ | 415/170 R |
| 3,251,601 | 5/1966 | Harvey................................. | 277/53 |
| 3,501,246 | 3/1970 | Hickey................................. | 415/170 |
| 3,746,462 | 7/1973 | Fakuola.............................. | 415/115 |

FOREIGN PATENTS OR APPLICATIONS

| | | | |
|---|---|---|---|
| 13,004 | 1906 | United Kingdom................... | 277/56 |
| 162,075 | 4/1921 | United Kingdom................... | 277/53 |
| 285,857 | 6/1929 | United Kingdom................... | 277/53 |
| 54,380 | 5/1967 | Germany .............................. | 277/56 |
| 754,413 | 10/1933 | France............................. | 415/172 A |
| 724,316 | 2/1955 | United Kingdom................ | 415/170 |
| 485,833 | 11/1929 | Germany ............................. | 415/172 |
| 964,737 | 5/1957 | Germany ............................. | 277/53 |

Primary Examiner—Henry F. Raduazo
Attorney, Agent, or Firm—John F. Ahern; James W. Mitchell

[57] ABSTRACT

An improved leakage control structure is provided between a bucket cover of a turbine and the surrounding diaphragm thereof to reduce leakage of the fluid flow in this area during operation of the turbine.

6 Claims, 4 Drawing Figures

PATENTED JUL 29 1975 3,897,169

SHEET 1

LEAKAGE CONTROL STRUCTURE

BACKGROUND OF THE INVENTION

The present invention relates generally to a leakage control structure for minimizing fluid flow between the bucket cover and surrounding diaphragm of a turbine. More specifically, the present invention is directed to an improvement to existing leakage control structures which improvement can be incorporated into present turbine structures with a minimum amount of restructuring of the turbine.

Most basically, the fluid flow in a turbine provides useful work when it flows through the moving buckets of a turbine which buckets are generally mounted on the rotor of a turbine. The fluid flow through the buckets is to be distinguished from leakage around the radial tips of the bucket, the latter producing no useful work. In modern turbine structures, means have been sought continually to minimize leakage of the fluid flow around the radial tips of the buckets in a turbine in order to increase the efficiency of the turbine.

Presently, a bucket cover is circumferentially mounted about the radial end tips of the several buckets disposed about any one axial portion of the turbine. The bucket cover includes apertures which fit over tenons located on the end tips of the buckets. The tenons are then peened over to securely hold the bucket cover in place. Therefore, the bucket cover functions as a shroud whereby fluid flow entering the flow path defined by the various buckets is forced to flow axially through the buckets as opposed to taking the path of least resistance and flowing radially outward and decreasing the efficiency of the structure.

The fluid leakage referred to above and the concern of the present invention is that a portion of the fluid flow emanating from a nozzle or stator of a turbine, subsequently, does not enter the working flow path defined by the bucket and bucket cover but rather proceeds radially outward and subsequently flows around the bucket cover and axially over the outer radial surface of the bucket cover. The prior art has reduced this leakage by providing a circumferential fin extending radially inward from the diaphragm toward the bucket cover. The fin, or spillband or spillstrip as the fin is also known in the art, extends to a point adjacent the outer radial surface of the bucket cover. However, there is, necessarily, a gap between the end tip of the inwardly extending fin and the outer radial surface of the bucket cover to provide a rotatable running clearance therebetween. It is through the foregoing gap, that leakage in present turbine structures takes place.

The present invention provides an improvement over prior art structures whereby fluid flow leakage between the fin and bucket cover of the prior art structures is further reduced or minimized. In this manner, the useful work produced by the turbine and the efficiency thereof are increased, since a greater amount of the fluid flow is directed against the working surfaces of the buckets. The present invention is particularly advantageous since it can be incorporated into present turbine structures with only a minimum amount of cost.

Accordingly, it is an objective of the present invention to provide an improved structure for further minimizing fluid flow leakage between the diaphragm and bucket cover of turbine structures.

A further objective of the present invention is to provide an improved structure for turbines in accordance with the present invention which structures may be incorporated into existing turbine designs with a minimum amount of redesign or additional cost.

SUMMARY OF THE INVENTION

In carrying out the objectives of this invention, in one form thereof, a structure is provided for further reducing or minimizing fluid flow leakage occurring between the diaphragm and the outer radial surface of a bucket cover of a prior art turbine. More specifically, a bucket cover is provided which bucket cover includes a plurality of circumferentially stepped portions extending radially outward and located on the downstream side of the existing or first fin of a turbine. A first stepped portion of said plurality of circumferentially stepped portions is located to dissipate the kinetic energy of the fluid flow leaking through the gap between the first fin and outer radial surface of the first stepped portion of the bucket cover. In combination with the stepped portions on the bucket cover, a second fin is provided which also extends radially inward from the turbine diaphragm and circumferentially thereabout. The tip of the second fin is downstream of the upstream edge of a second stepped portion. Therefore, the second fin further reduces any fluid flow leakage which passes by the first fin after having interacted with the second stepped portion.

DESCRIPTION OF THE DRAWINGS

The subject matter which is regarded as the invention is particularly pointed out and distinctly claimed in the claims set forth at the end of the specification. The invention, however, both as to organization and method of practice may be best understood by reference to the following description taken in conjunction with the accompanying drawings, in which:

DESCRIPTION OF THE PREFERRED EMBODIMENT

Figure 1:
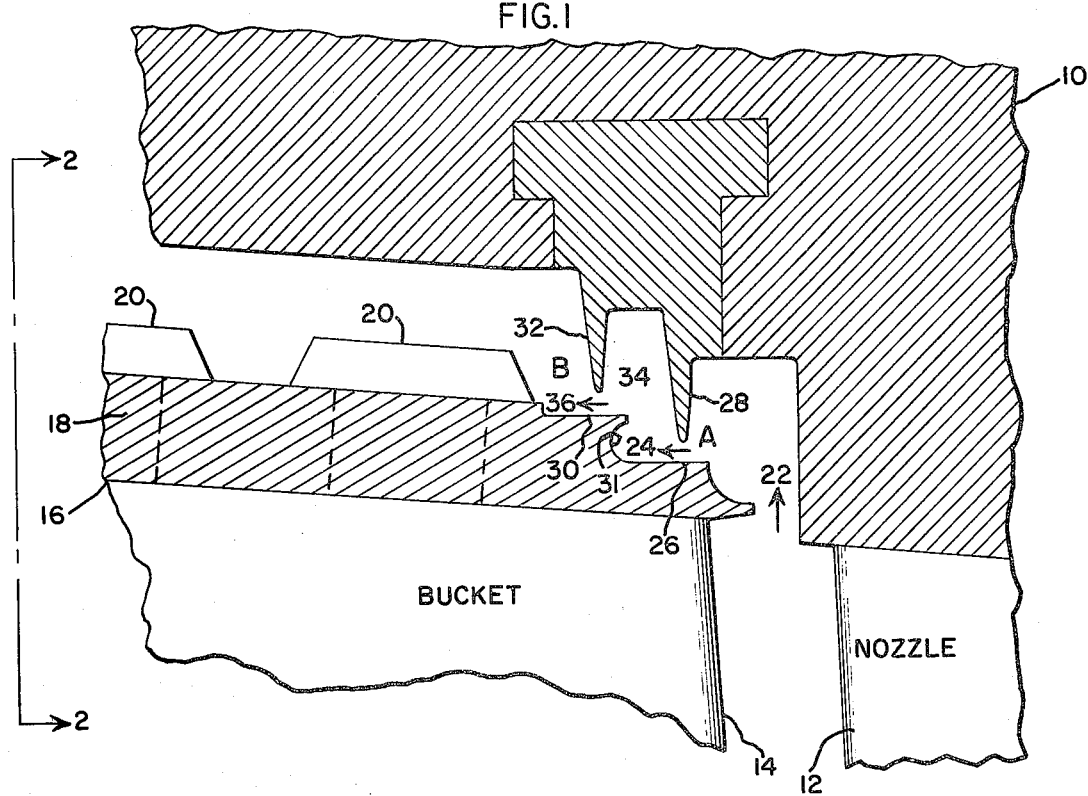
FIG. 1 is a sectional view of a longitudinal portion of a bucket, bucket cover and surrounding diaphragm of a turbine, in one embodiment of the invention.

Referring to FIG. 1 of the drawings, a fixed diaphragm outer ring 10 of a turbine, as shown in longitudinal cross-section, which includes a plurality of stationary nozzles 12, is disposed about an axial portion of the turbine. The nozzles 12, or stator blades as they are also known in the art, are longitudinally and circumferentially disposed to direct a pressurized fluid flow against a plurality of rotatable buckets 14. In FIG. 1, therefore, a fluid flow such as pressurized steam would flow from right to left giving up pressure and expanding at each subsequent stage of corresponding nozzles and rotatable buckets as is well known in the art.

Figure 2:
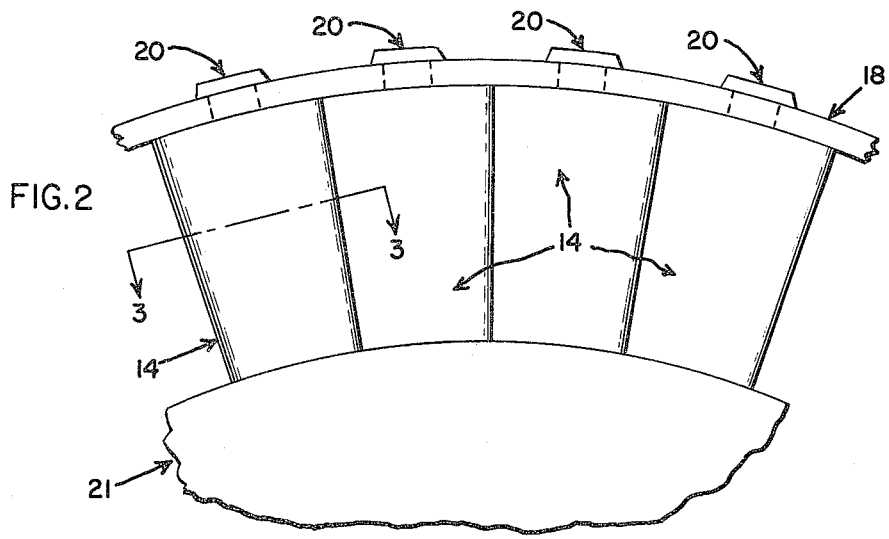
FIG. 2 is a sectional view along line 2—2 of FIG. 1.
Figure 3:
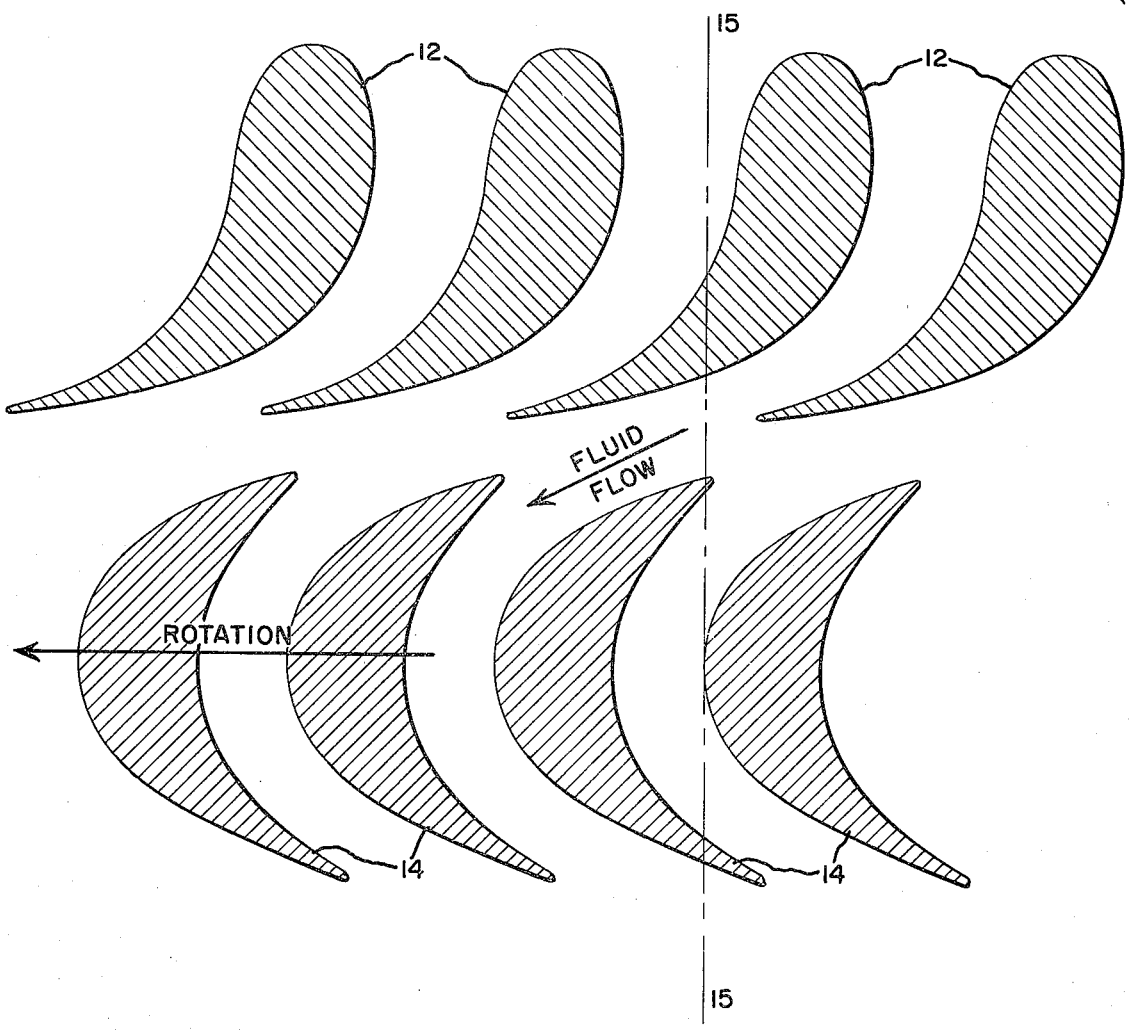
FIG. 3 is a cross-sectional view of nozzles and buckets taken along line 3—3 of FIG. 2.

The buckets 14 are circumferentially disposed on a rotor bucket wheel 21 about the axis of the turbine rotor shaft as shown in FIG. 2 of the drawings. As shown in FIG. 3, the rotatable buckets 14 are curvilinear in cross section and react to a fluid flow impinging in the direction shown in FIG. 3, to rotate in the direction indicated.

Referring again to FIG. 1, the radial extremities 16 of a group of buckets 14 are circumferentially connected by a bucket cover 18.

As shown in the embodiment of FIG. 1, the bucket cover 18 may include a plurality of apertures through which protruding tenons 20 extend radially outward from the free ends of the bucket 14. One possible structural form, known in the art, for holding the bucket cover 18 in place therefore has been to "peen over" the tenons 20 to thereby hold the bucket cover 18 firmly in place.

The bucket cover 18 acts as a shroud with respect to a fluid flow proceeding across the working surfaces of the buckets 14. The pressurized fluid flow is forced to react with the working surface of the buckets 14 as opposed to merely flowing radially outward and around the radial extremities or free ends 16 of the buckets.

As can be appreciated from FIG. 1, it is necessary to minimize fluid flow leakage through the fluid leakage path 22 defined between the inner radial surface of the diaphragm outer ring 10 and the outer radial surface of the bucket cover 18. Since any fluid flow proceeding along this fluid leakage path does not proceed over the working surface of the bucket 14, there is an energy loss and the efficiency of the turbine is decreased. The improvement provided by the present invention resides in a structure for further minimizing fluid flow leakage along leakage path 22, therefore, further increasing the efficiency of a turbine as compared to prior art structures.

To implement the invention as shown in the embodiment of FIG. 1, a first gap 24 is formed between a first stepped portion 26 of the bucket cover 18 and a first fin 28 extending radially inward from the diaphragm outer ring 10. The first fin 28 which is known in the prior art extends circumferentially about the inner surface of the diaphragm outer ring and is provided to minimize fluid flow leakage as much as possible through the gap 24. The embodiment shown in FIG. 1 further includes a second stepped portion 30, including a concave side surface 31, formed on the bucket cover 18. The second stepped portion 30 is stepped or raised radially outward with respect to the outer surface of first stepped portion 26 of the bucket cover and extends beyond the innermost extension of first fin 28.

In FIG. 1, side surface 31 is illustratively shown as having a concave surface in order to facilitate machining. However, side surface 31 could be flat or have other appropriately machined contours and function properly. It has been found, though, that the concave surface provides better leakage control. Therefore, with the second stepped portion 30 adjacent to and spaced apart from the fin 28, the kinetic energy of the fluid flow leakage flowing through gap 24 is dissipated by the reaction of such leakage against the side surface 31.

In combination with the second stepped portion 30, a second fin 32 extends radially inward from the diaphragm outer ring 10 toward the second stepped portion 30 to a point adjacent to and spaced apart from the surface thereof.

In operation, with the kinetic energy of the fluid leakage through gap 24 substantially dissipated by the side surface 31 and with the inclusion of the second fin 32, a back pressure sealing effect within the annular cavity 34 is created with respect to gap 24. The sealing effect provided by the improved structure in accordance with the invention substantially reduces fluid flow leakage through gap 24 as it has existed in prior art turbine structures.

Although the prior art shows second fins extending radially inward from a diaphragm outer ring, such second fins have been located at the downstream edge of a bucket cover and without a stepped or raised portion such as 30. In the present invention, the side surface 31 is located at a maximum distance approximately ten times the width of gap 24 downstream from fin 28. The second fin 32 is located a short distance downstream from the side surface 31. Substantially similar results can be obtained if the second fin is axially located anywhere intermediate the side surface 31 and the first tenon 20 located downstream from the side surface 31. The gap 36 defined by fin 32 and second stepped portion 30 is essentially the same width as that of gap 24. The disposition of the second stepped portion 30 and the second fin 32 in FIG. 1 is a primary factor in the sealing effect created by the dissipation of the kinetic energy of leakage flowing through gap 24.

Figure 1A:
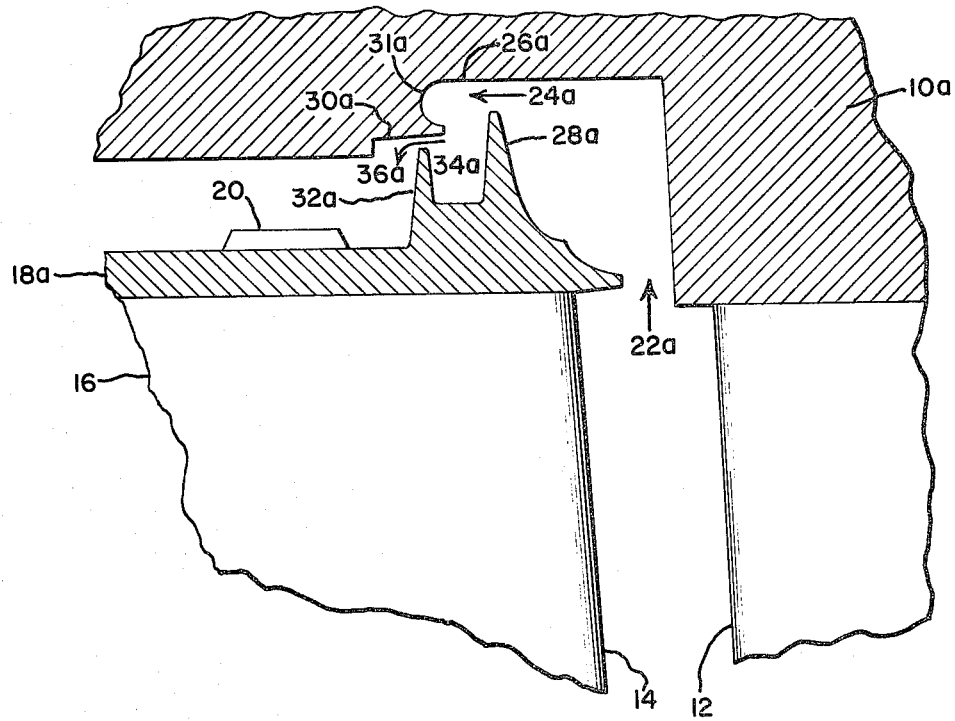
FIG. 1a is a sectional view of a longitudinal portion of a bucket, bucket cover and surrounding diaphragm of a turbine, in an alternate embodiment of the invention.

FIG. 1a shows an alternative embodiment including the invention. This embodiment includes the incorporation of stepped portions 26a and 30a in a diaphragm outer ring 10a with respectively cooperating fins 28a and 32a being located on the outer radial surface of bucket cover 18a. This alternative design, therefore, is essentially inverted with respect to the design shown in FIG. 1. However, all of the spatial relationships of the elements and inventive concepts disclosed with respect to FIG. 1 correspondingly apply to FIG. 1a.

Another alternative embodiment within the scope of the present invention would be the placement of the leakage control structure shown in FIG. 1 on the discharge or downsteam side of the bucket cover 18.

While there is shown one embodiment of the invention herein, it is, of course, understood that various modifications may be made, and it is intended to cover in the appended claims, all such modifications as fall within the true spirit and scope of the invention.

What is claimed as new and desired to be secured by Letters Patent of the United States is:

1. An improved leakage control structure for use in the fluid flow path of a turbine comprising:

a diaphragm including a stationary nozzle ring upstream from an adjacent bucket wheel, the bucket wheel including a plurality of radially extending buckets; the buckets connected at their tip portions by at least one bucket cover circumferentially disposed about the bucket tips;

a fluid leakage path defined by a pair of axially extending boundaries including the radially outer circumferential surface of the bucket cover and a radially inner, annular diaphragm portion downstream from the nozzle ring;

first and second axial stepped portions formed on one of the pair of boundaries upstream of the connections and further including an annular radially extending side surface therebetween;

a first annular fin extending radially from the other of said boundaries toward the first stepped portion and terminating in a tip portion closely adjacent the first stepped portion to form a clearance therebetween;

a second annular fin extending radially from the other of said boundaries toward the second stepped portion and terminating in a tip portion closely adjacent the second stepped portion; and, the first and second annular fins axially positioned substantially upstream from the mid-point between the bucket leading and trailing edges.

2. The improved leakage control structure according to claim 1 wherein said side surface on said second stepped portion is concave in contour.

3. The structure recited in claim 1 wherein the radially extending side surface is downstream from the first annular fin a distance of approximately 10 times the radial width of the clearance between the first annular fin and the first stepped portion; and, the second annular fin is closely adjacent and downstream from the side surface.

4. The structure recited in claim 1 wherein the bucket cover is attached to each bucket at a point downstream from the second annular fin.

5. The structure recited in claim 1 wherein the one of said boundaries is the bucket cover and the other of said boundaries is the disphragm portion whereby the first and second annular fins extend radially inwardly from the diaphragm portion toward the first and second stepped portions respectively, on the bucket cover.

6. The structure recited in claim 1 wherein one of the boundaries is the diaphragm portion and the other boundary is the bucket cover whereby the first and second annular fins extend radially outwardly from the bucket cover toward the first and second stepped portions respectively, on the diaphragm portion.

* * * * *